US008525644B1

United States Patent
Yonekura et al.

(10) Patent No.: US 8,525,644 B1
(45) Date of Patent: Sep. 3, 2013

(54) DRIVER'S LICENSE DETECTOR

(76) Inventors: George Susumu Yonekura, San Jose, CA (US); Duane Yamasaki, El Cerrito, CA (US); Michael Cao, Milpitas, CA (US)

( * ) Notice: Subject to any disclaimer, the term of this patent is extended or adjusted under 35 U.S.C. 154(b) by 1104 days.

(21) Appl. No.: 11/895,321

(22) Filed: Aug. 23, 2007

(51) Int. Cl.
*H04B 7/00* (2006.01)

(52) U.S. Cl.
USPC ... 340/5.86; 340/10.1; 340/10.41; 340/572.1; 235/380; 235/487

(58) Field of Classification Search
USPC ............ 340/5.86, 5.6, 425.5, 5.81, 5.82, 340/550, 5.53, 10.1, 10.3, 5.83, 5.84, 5.85, 340/10.4, 10.41, 572.1; 235/380, 382, 487
See application file for complete search history.

(56) References Cited

U.S. PATENT DOCUMENTS

| | | | | |
|---|---|---|---|---|
| 5,982,292 | A * | 11/1999 | Tagawa et al. | 340/5.64 |
| 6,100,804 | A * | 8/2000 | Brady et al. | 340/572.7 |
| 6,342,830 | B1 * | 1/2002 | Want et al. | 340/10.1 |
| 2004/0046646 | A1 * | 3/2004 | Eskridge | 340/425.5 |
| 2006/0015394 | A1 * | 1/2006 | Sorensen | 705/13 |
| 2006/0214773 | A1 * | 9/2006 | Wagner et al. | 340/10.2 |
| 2007/0023508 | A1 * | 2/2007 | Brookner | 235/382 |
| 2008/0122593 | A1 * | 5/2008 | Yuhara | 340/425.5 |

OTHER PUBLICATIONS

Wikipedia, "Radio-frequency identification" http://en.wikipedia.org/wiki/RFID, pp. 1-25.
Mark Baard, "RFID Driver's Licenses Debated", *WIRED*, Oct. 6, 2004. 9:50 am., http://www.wired.com/news/privacy/0,848,65243,00.html?tw=wn_tophead_5.

* cited by examiner

*Primary Examiner* — Nabil Syed
(74) *Attorney, Agent, or Firm* — Haverstock & Owens LLP

(57) ABSTRACT

A license detector system enables a person such as a police officer to monitor vehicles on the road to ensure drivers have valid licenses. Within each valid license is an RFID tag which contains specific information and each RFID tag is able to send that information to a detector when requested. To use the system, the police officer aims the detector at a vehicle, initiates the signal to be received by the RFID tag within the license and waits to receive a signal back from the RFID tag. If a signal is received, then a valid license has been detected within the vehicle. However, if no signal or an invalid signal is received by the detector, then no one, specifically the driver of the car, has a valid license. Upon discovering such information, the police officer should be justified in stopping the vehicle and taking the necessary police action.

45 Claims, 4 Drawing Sheets

DRIVER'S LICENSE DETECTOR

FIELD OF THE INVENTION

The present invention relates to the field of radio frequency identification. More specifically, the present invention relates to the field of utilizing radio frequency identification within a driver's license or other identification device.

BACKGROUND OF THE INVENTION

Radio Frequency IDentification (RFID) is utilized in many applications including smart cards, transport payments, product tracking and personnel tracking. In each of these applications, an RFID tag or transponder is attached to or incorporated within a product or person. Then, the RFID tag is used to identify the product or person using radio waves.

There are many different types of RFID tags. The three main types include passive, semi-passive and active tags. Passive tags require no power source whereas semi-passive tags use a small power source and active tags need an internal power source.

Passive RFID tags are capable of functioning without an internal power source. A tiny amount of energy is needed for the integrated circuit within the tag to function, and the electrical current induced in the antenna by the incoming radio frequency signal provides enough power. It is common for passive tags to use the antenna to collect power from the incoming signal and also to transmit the outbound signal. Furthermore, since passive tags have no internal power source, they are able to be produced extremely small. Passive tags also generally have a very long life span since there is no internal power source to drain or fail.

Semi-passive RFID tags utilize a small battery which powers the RFID tag thus removing the need for specialized two-way antennas which are used in passive RFID tags.

Active RFID tags require an internal power source which is used to power the integrated circuit to generate an outgoing signal. Active tags are considered to be more reliable than passive tags with their ability to transmit at higher power levels. Active tags are also able to be made relatively small, such as the size of a coin. As technology improves, active tags will eventually become even smaller.

As mentioned above, RFID has many applications. Another application includes being used within a driver's license. There has been significant discussion of utilizing RFID within drivers' licenses for the purposes of identifying drivers without having to manually inspect the license. Licenses would not have to be put into a reader device like they are today where a magnetic strip is used to store information. Rather, the license could be scanned using an RFID scanner. "Wired News: RFID Driver's Licenses Debated" http://www.wired.com/news/privacy/0,1848,65243, 00.html?tw=wn_tophead_5 Although utilizing RFID within driver's licenses is known, the concept has only been implemented to remove the need for swiping the driver's license.

Furthermore, due to the fourth amendment of the Constitution which prohibits unauthorized searches and seizures, police officers are unable to pull over drivers for simply suspecting they are driving without a license. The police must first have a reason to pull over someone, such as a traffic violation. This presents a problem because there are many individuals who drive illegally without a valid license after it has been suspended, revoked or has never been received for one reason or another. Yet the police are generally unable to do much to stop such occurrences since their opportunities to cite these violators are limited. The unlicensed drivers are potentially hazardous and would be ticketed under state law for driving without a license if discovered. Hence, an implementation that does not violate the fourth amendment yet is able to detect drivers without a valid license is highly desirable.

SUMMARY OF THE INVENTION

A license detector system enables a person such as a police officer to monitor vehicles on the road to ensure drivers have valid licenses. Within each valid license is an RFID tag which contains specific information and each RFID tag is able to send that information to a detector when requested. To use the system, the police officer aims the detector at a vehicle, initiates the signal to be received by the RFID tag within the license and waits to receive a signal back from the RFID tag. If a signal is received, then a valid license has been detected within the vehicle. However, if no signal or an invalid signal is received by the detector, then no one, specifically the driver of the car, has a valid license. Upon discovering such information, the police officer should be justified in stopping the vehicle and taking the necessary police action.

In one aspect, a system for detecting a license comprises a tag device and a detector for transmitting a first signal to the tag device to request and receive information contained within the tag device, wherein the tag device receives the first signal from the detector and sends a second signal to the detector. The tag device is a Radio Frequency IDentification tag. The second signal contains information within the tag device. The tag device is selected from the group consisting of passive, semi-passive and active tags. The license is selected from the group consisting of a driver's license, a fishing license, a hunting license, a pilot's license and a government issued identification. The detector further comprises a verifying component for verifying validity of the second signal. The detector further comprises an indicator for indicating whether the license is detected. The indicator comprises one or more visual confirmations. The indicator comprises one or more light emitting diodes. The detector further comprises a processor for processing the information, a first transmitter for transmitting the first signal and a sensor for sensing the second signal. The detector further comprises a second transmitter to transmit a third signal to a remote location. The detector is hand-held. The detector is portable. Alternatively, the detector is affixed to an immobile object. Alternatively, the detector is affixed to a police car. The system further comprises a remote system for receiving a request signal containing information within the tag device for determining a status of the tag device and transmitting a status signal containing the status of the tag device to the detector.

In another aspect, a system for detecting a driver's license within a moving vehicle comprises a passive Radio Frequency IDentification tag device and a detector for transmitting a first signal to the tag device to request and receive information contained within the tag device, wherein the tag device receives the first signal from the detector and sends a second signal of the information contained within the tag device to the detector, further wherein the detector further comprises a processor for processing the information, a first transmitter for transmitting the first signal, a sensor for sensing the second signal, a verifying component for verifying validity of the second signal and an indicator for indicating whether the license is detected. The indicator comprises one or more visual confirmations. The indicator comprises one or more light emitting diodes. The system further comprises a remote system for receiving a request signal containing information within the tag device for determining the status of the tag device and transmitting a status signal containing the status of the tag device to the detector.

In yet another aspect, a method of detecting a license within a vehicle comprises transmitting a first signal from a detector to a tag device within the license and receiving a second signal at the detector from the tag device. The tag device is a Radio Frequency IDentification tag. The tag device is selected from the group consisting of passive, semi-passive and active tags. The license is selected from the group consisting of a driver's license, a fishing license, a hunting license, a pilot's license and a government issued identification. The method further comprises verifying validity of the second signal with a verifying component. The method further comprises indicating whether the license is detected with an indicator. The indicator comprises one or more visual confirmations. The indicator comprises one or more light emitting diodes. The method further comprises transmitting a third signal containing a status of the tag device to a remote location. The detector is hand-held. The detector is portable. Alternatively, the detector is affixed to an immobile object. Alternatively, the detector is affixed to a police car. The method further comprises transmitting a third signal containing information within the tag device to a remote device and receiving a fourth signal at the detector from the remote device containing a status of the tag device.

In another aspect, a method of detecting a license comprises acquiring a target vehicle, transmitting a first signal from a detector towards the target vehicle, waiting to receive a second signal from a tag device the license within the target vehicle and indicating whether the license is detected within the target vehicle. The tag device is a Radio Frequency IDentification tag. The tag device is selected from the group consisting of passive, semi-passive and active tags. The license is selected from the group consisting of a driver's license, a fishing license, a hunting license, a pilot's license and a government issued identification. The method further comprises verifying validity of the second signal with a verifying component. The method further comprises indicating whether the license is detected with an indicator. The indicator comprises one or more visual confirmations. The indicator comprises one or more light emitting diodes. The method further comprises transmitting a third signal containing information within the tag device to a remote device and receiving a fourth signal at the detector from the remote device containing a status of the tag device.

In yet another embodiment, an identification device comprises identification information and a tag device configured to communicate with a detector. The identification device is a card. The tag device is a Radio Frequency IDentification tag. The tag device is selected from the group consisting of passive, semi-passive and active tags. The information includes only valid or not valid.

In another embodiment, a detector for detecting a license, comprises a processor for processing information received from a tag device within the license, a first transmitter for transmitting a first signal to the tag device within the license, a sensor for sensing a second signal received from the tag device within the license, a verifying component for verifying validity of the second signal and an indicator for indicating whether the license is detected. The detector further comprises a second transmitter to transmit a third signal to a remote location. The processor communicates with a remote system to determine a status of the license.

DETAILED DESCRIPTION OF THE PREFERRED EMBODIMENT

A license detector system is described herein. The license detector system includes a detector and a Radio Frequency IDentification (RFID) tag where the tag is embedded within a license. The detector has the ability to detect the existence of an RFID tag from many feet away (e.g. more than 10 feet away) while the tag is moving at high speeds (e.g. while in a vehicle).

Figure 1:
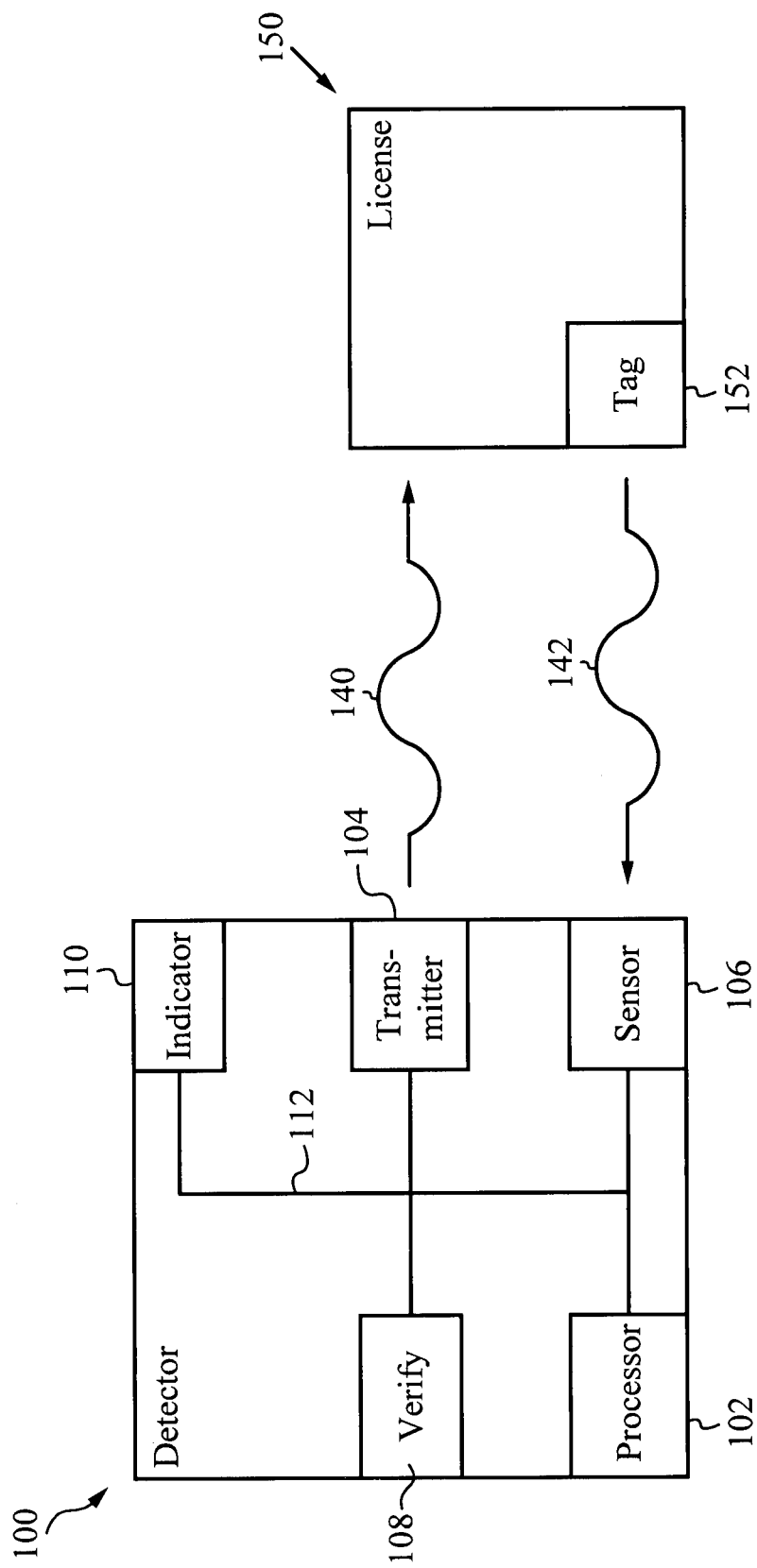
FIG. 1 illustrates a block diagram of the detector and the license of the present invention.

FIG. 1 illustrates a block diagram of the present invention. An RFID detector 100 includes a processor 102, a transmitter 104, a sensor 106, a verifying component 108 and an indicator 110 all coupled together by a system bus 112. As apparent to those skilled in the art, the transmitter 104 and the sensor 106 could also be integrated into a transceiver. A license 150 or identification card or device includes an RFID tag device 152 which is able to communicate with the detector 100. The license 150 which contains the tag device 152 is preferably a standard driver's license. Alternatively, the license 150 is any other appropriate identification, membership or license card or device. The communication between the detector 100 and the tag device 152 occurs by the detector 100 sending a first signal 140 to the tag device 152 and then the tag device 152 sending a second signal 142 back to the detector 100. The second signal 142 contains information about the tag device 152. In some embodiments, the information includes all of the information on the license 150. Other implementations include less information.

Within the detector, the processor 102 performs standard processing functions in addition to processing the information received from the tag device 152. The transmitter 104 sends the first signal 140 to the tag device 152 to initiate data transfer. The sensor 106 then receives the second signal 142 returning from the tag device 152. In some embodiments, the verifying component 108 is used to verify the authenticity and validity of the second signal 142 to prevent cloning or other attempts to improperly trick the detector 100 into believing a valid license with a tag device is present. The indicator 110 is implemented to indicate the status of the tag device 152. Furthermore, the indicator 110 is implemented in a variety of ways including but not limited to, one or more visual confirmations, one or more light emitting diodes (LEDs) or a liquid crystal display (LCD).

For example, in some embodiments, two LEDs are utilized where the first LED is red and the second LED is green. After the detector 100 sends out the first signal 140 from the transmitter 104, if the second signal 142 is received at the sensor 106 within a designated time period, the greed LED is illuminated to indicate that a valid tag device was detected. However, if the second signal 142 is not received in time, then the red LED is illuminated to indicate that no valid tag device was detected. Furthermore, additional LEDs are able to be implemented if desired, such as one to indicate the second signal 142 was received, but it was not verified by the verifying component 108.

In other embodiments, an LCD display is able to present information in text form. Using an LCD as the indicator 110 is also able to present even more information including the entire set of information shown on a driver's license including name, address, birth date, height, weight, sex, and eye color. For applications where this information will not generate privacy issues, such information is able to be retrieved. However, when privacy is a likely concern, the use of a set of LEDs should be able to stifle such worries since a red LED versus a green LED provides no personal information other than whether the person has a valid driver's license or not. Thus, in some embodiments, all of the information on the front of a driver's license is sent from the tag device 152 to the detector 100. However, in other embodiments, only a status signal is sent without providing any personal information. Therefore as much or as little information is able to be retrieved from the tag device 152 as desired. The tag device 152 simply needs to be configured accordingly.

Figure 2A:
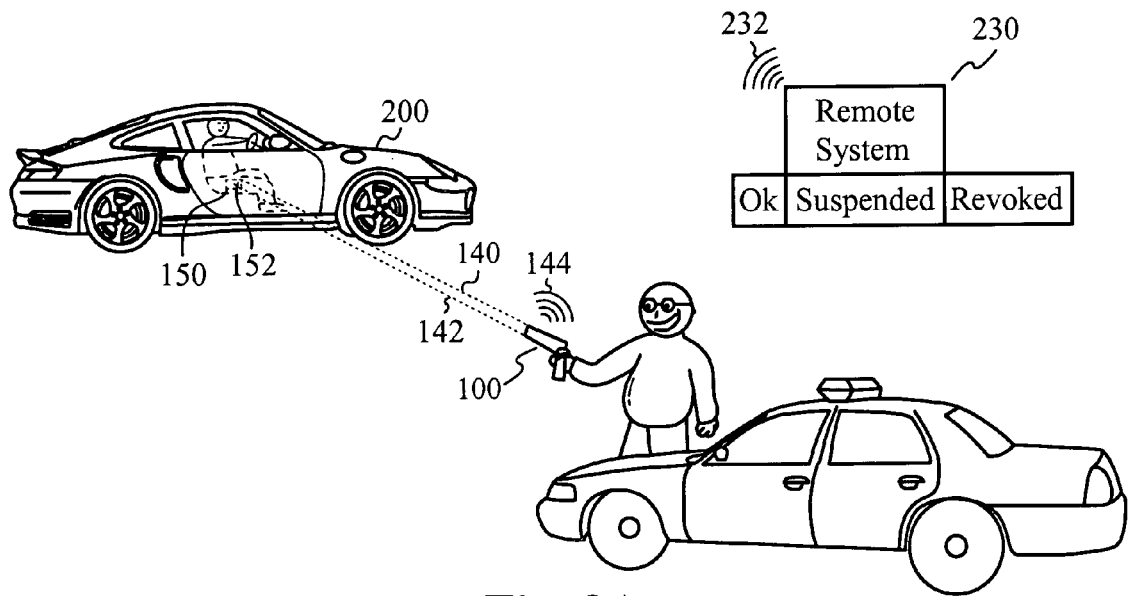
FIG. 2A illustrates an embodiment of the present invention.

FIG. 2A illustrates an embodiment of the present invention. The detector 100 is within a hand-held or portable unit shaped similar to a radar gun. Other shape implementations are possible. As a vehicle 200 approaches the person or police officer with the detector 100, the police officer aims the detector 100 at the vehicle 200 and transmits a first signal 140 directed at the vehicle 200. Since the passenger in this example has a license 150 with a valid tag device 152, a second signal 142 is sent back to the detector 100. The police officer is then able to view the indicator 110 (FIG. 1) and determine that this vehicle does in fact contain a valid driver's license.

In some embodiments, the processor also communicates with a remote system 230 to determine the status of the license 150 such as in good standing, suspended or revoked. A request signal 144 is sent from the detector 100 to the remote system 230 requesting the status of the specific license 150. The remote system 230 then sends the requested status back in a status signal 232 to the detector 100.

In some embodiments, the tag device 152 within the license 150 is utilized for purposes other than determining if a valid driver's license is within a vehicle. For example, instead of requiring people to purchase transponders to communicate with automated toll booth collectors such as Fastrak, a user's license with tag device is able to transmit the necessary information.

Figure 2B:
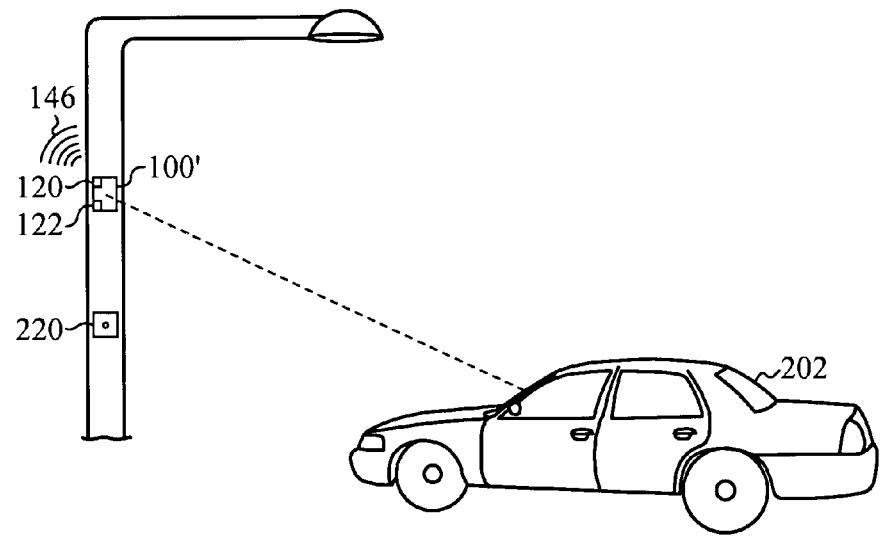
FIG. 2B illustrates an embodiment of the present invention.

FIG. 2B illustrates an embodiment of the present invention. A detector 100' is positioned on a stationary object such as a light post or telephone pole. In the example shown, a first signal 140 is transmitted towards an approaching vehicle 202. The driver of the vehicle 202 does not have a valid driver's license with tag device and thus a second signal is not sent back to be received by the detector 100'. The detector 100' is similar to the detector 100 with additional components. As soon as it is determined that the vehicle 202 is being driven without a licensed driver, a second transmitter 120 transmits a third signal 146 containing this information to the authorities, likely remote from the location of the detector 100'. The information reaches the police via any possible means including satellite, cellular towers or the like. In some embodiments, the information transmitted is limited to the fact that a car passed by without a valid license inside to be used for data collection to determine how many unlicensed drivers are on the road. With additional information transmitted, such as a picture of the vehicle or the vehicle's license plate, from a camera 220, the police are able to then take that information and use it to pull over the vehicle 202 soon thereafter. Although the camera is shown separate from the detector 100', in some embodiments the camera 220 is included within the detector 100'. Since the stationary object is able to be implemented without human intervention, an additional sensor 122 is utilized to detect when vehicles are in the correct position to transmit the first signal 140 to detect a license.

In some embodiments, the detector 100' is positioned within a toll booth wherein the vehicle does not receive access to pass through if a valid license is not detected.

In another embodiment, instead of the detector being handheld, the detector is secured within or on a police car, so that the police officer is able to drive and scan vehicles for valid driver's licenses.

Figure 3:
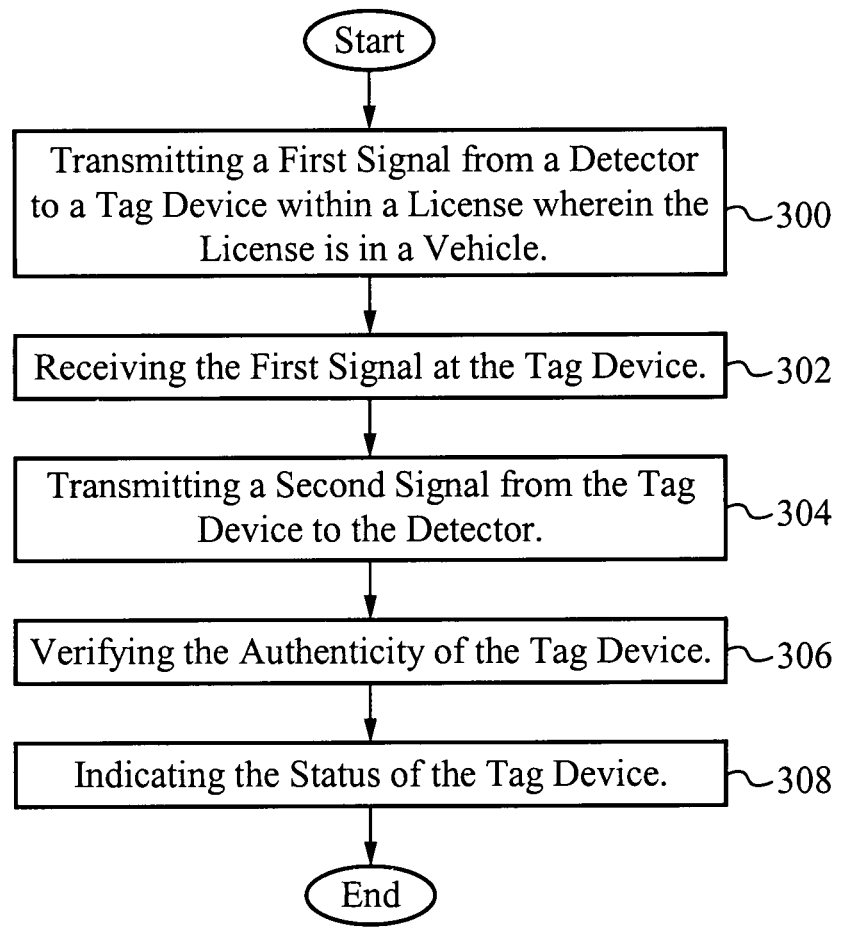
FIG. 3 illustrates a flow chart of a process of utilizing the present invention.

FIG. 3 illustrates a flow chart of a process of utilizing the present invention. In the step 300, a first signal is transmitted from a detector to a tag device within a license. In some embodiments, the license is in a vehicle. In the step 302, the first signal is received at the tag device. Then, in the step 304, the tag device transmits a second signal back to the detector. In some embodiments, the tag device's authenticity is verified, in the step 306. In the step 308, the status of the tag device is indicated on the detector. In some embodiments, the status is indicated using a set of LEDs, and in other embodiments, an LCD is utilized to indicate the status. Moreover, in some embodiments, the status of the tag device is determined by sending a signal to a remote device for to determine the status and then the remote device sends the status back to the detector.

Figure 4:
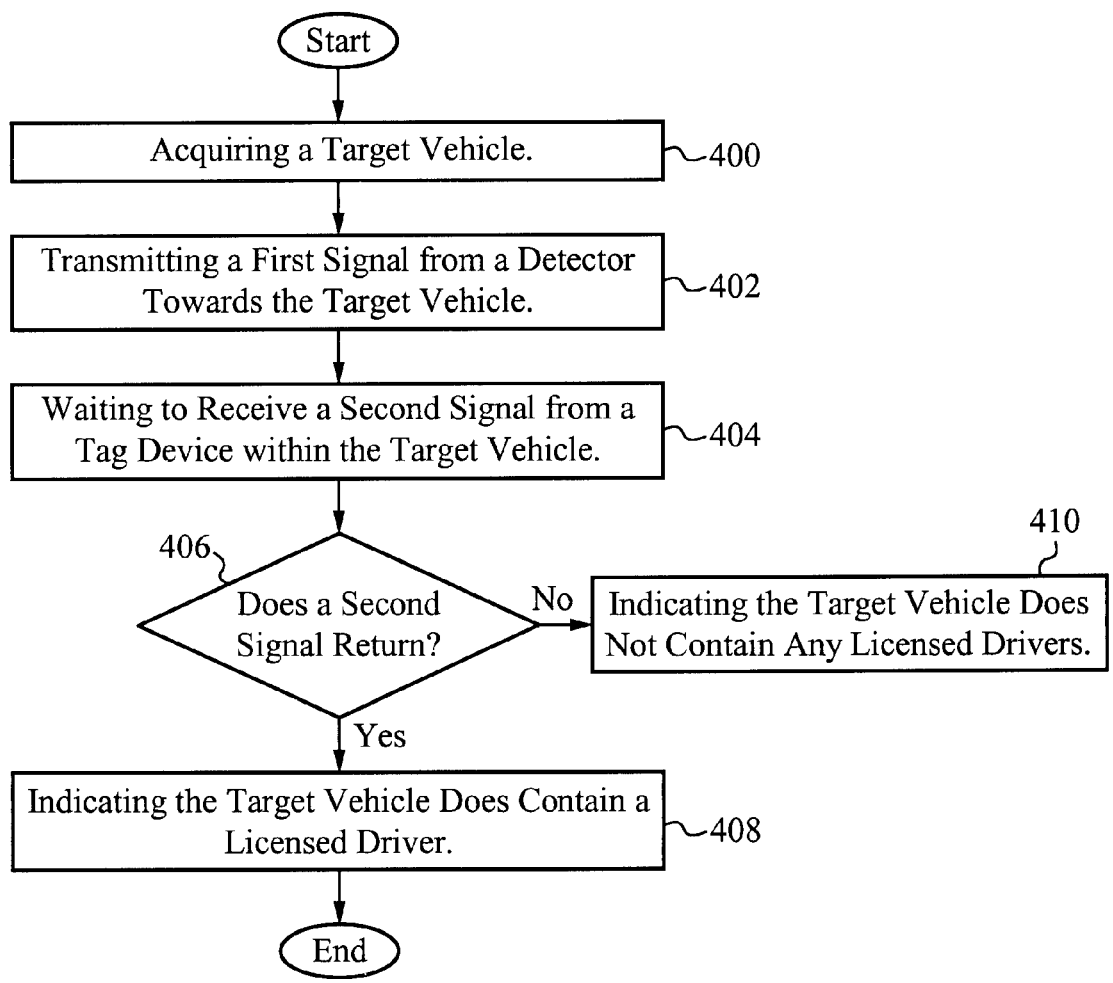
FIG. 4 illustrates a flow chart of a process of utilizing the present invention to determine if a vehicle contains a valid driver's license.

FIG. 4 illustrates a flow chart of a process of utilizing the present invention to determine if a vehicle contains a valid driver's license. In the step 400, a police officer acquires a target vehicle and aims the detector at the vehicle. In the step 402, the police officer, transmits a first signal from the detector towards the target vehicle. The police officer then waits to receive a second signal from a tag device within the target vehicle, in the step 404. The time to wait is variable, although it should be set depending on how long the second signal takes to be received. If the second signal does return in the step 406, then the indicator within the detector indicates that the target vehicle does contain a licensed driver, in the step 408. If the second signal does not return in the step 406, then the indicator within the detector indicates that the target vehicle does not contain a licensed driver, in the step 410. This process is able to be implemented with a hands-off system as well, such as the one described in FIG. 2B where the detector is affixed to a light post, tool booth or other fixed object. In the hands-off system, an additional step of sending a third signal to a remote location is implemented. The information contained within the third signal is able to inform the police if further action needs to be taken. In some embodiments, an additional signal is sent to a remote system to determine the status of the license where the remote system then sends the status back to the detector. Furthermore, the process is able to be repeated rapidly for each vehicle that passes by the detector.

In the preferred embodiment, the tag device utilized within the license is passive allowing a very small form factor and thus requiring little, if any, change in the current design of the license. In other embodiments, semi-passive or active tag devices are implemented. As the design of items such as batteries gets smaller, it will be possible to implement even an active tag device within the license without significant modifications.

In some embodiments, in addition to detecting valid driver's licenses, the license detector system is able to detect fishing licenses, hunting licenses, pilot's licenses, government issued identification and other types of licenses or membership cards. For example, if a department of fish and wildlife ranger were able to simply drive around a lake and point and click to determine if fishermen have valid fishing licenses, the process would be much more efficient to detect violators of the law. Furthermore, with the increased efficiency, more areas of the lake are able to be investigated, and thus more fisherman will purchase fishing licenses out of fear of being caught.

To utilize the present invention, a user, typically a police officer or someone with authority, directs the detector towards a target. The target is a vehicle such as an automobile or a boat. The target could potentially be an individual as well. After aiming at the target, the police officer activates the detector which sends a first signal towards the target. The first signal is received by a tag device embedded within a license if the license is within the target. After receiving the signal, the tag device sends a second signal back to the detector. After the detector receives the second signal, the signal's validity is verified, in some embodiments. In some embodiments, a remote system is utilized to determine the tag device's status. An indicator indicates the status of the tag device, so that the police officer is able to determine whether further action is necessary. If a tag device was not detected within the target, then the second signal would not be sent and after a specified period of time, the detector would indicate that the target did not have a licensed driver. The police officer is then able to use this information to pull over drivers who are driving without valid driver's licenses or for fishing rangers to cite fishermen without valid fishing licenses.

In operation, the present invention is used to detect the existence of valid licenses within a vehicle. Specifically, police officers are able to implement the detector similar to a radar gun used for speed. The police officer uses the detector to send a signal to a specified vehicle and then waits to see if a valid return signal is received. If the driver has a valid driver's license containing an RFID tag, then a valid signal will be returned to the detector. If a valid signal is not received, the detector will inform the officer, and he will then have a reason to pull over the driver and cite him/her for a driving violation. In some embodiments, the detector is not hand-held, but is positioned so that it can detect valid driver's licenses and then transfer information to the authorities such as the police.

The present invention has been described in terms of specific embodiments incorporating details to facilitate the understanding of principles of construction and operation of the invention. Such reference herein to specific embodiments and details thereof is not intended to limit the scope of the claims appended hereto. It will be readily apparent to one skilled in the art that other various modifications may be made in the embodiment chosen for illustration without departing from the spirit and scope of the invention as defined by the claims.

What is claimed is:

1. A system for detecting the presence of a license comprising:
    a. a tag device coupled to the license;
    b. a detector for transmitting a first signal to the tag device to request and receive information contained within the tag device, wherein the tag device receives the first signal from the detector and sends a second signal to the detector; and
    c. a verifier for authenticating the second signal by determining if the second signal has authentication data;
wherein the information contained within the tag device sent within the second signal indicates the presence of the license at the location of the tag device.

2. The system as claimed in claim 1 wherein the tag device is a Radio Frequency IDentification tag.

3. The system as claimed in claim 1 wherein the second signal contains information within the tag device.

4. The system as claimed in claim 1 wherein the tag device is selected from the group consisting of passive, semi-passive and active tags.

5. The system as claimed in claim 1 wherein the license is selected from the group consisting of a driver's license, a fishing license, a hunting license, a pilot's license and a government issued identification.

6. The system as claimed in claim 1 wherein the verifying component verifies the validity of the content of the second signal by comparing the content of the second signal to a set of verified content.

7. The system as claimed in claim 1 wherein the detector further comprises a first indicator that activates if the second signal is detected by the detector and a second indicator that activates if the second signal is not detected by the detector within a predetermined time period.

8. The system as claimed in claim 7 wherein the first and second indicators comprise one or more visual confirmations.

9. The system as claimed in claim 7 wherein the first and second indicators comprise one or more light emitting diodes.

10. The system as claimed in claim 1 wherein the detector further comprises a processor for processing the information, a first transmitter for transmitting the first signal and a sensor for sensing the second signal.

11. The system as claimed in claim 10 wherein the detector further comprises a second transmitter to transmit a third signal to a remote location.

12. The system as claimed in claim 1 wherein the detector is hand-held.

13. The system as claimed in claim 1 wherein the detector is portable.

14. The system as claimed in claim 1 wherein the detector is affixed to an immobile object.

15. The system as claimed in claim 1 wherein the detector is affixed to a police car.

16. The system as claimed in claim 1 further comprising a remote system for receiving a request signal containing information within the tag device about the license, for determining a good standing, suspended or revoked status of the license and for transmitting a status signal containing the status of the license to the detector.

17. A system for detecting the presence of a driver's license within a moving vehicle comprising:
    a. a passive Radio Frequency IDentification tag device coupled to the driver's license; and
    b. a detector for transmitting a first signal to the tag device to request and receive information contained within the tag device, wherein the tag device receives the first signal from the detector and sends a second signal of the information contained within the tag device to the detector, further wherein the detector further comprises:
        i. a processor for processing the information;
        ii. a first transmitter for transmitting the first signal;
        iii. a sensor for sensing the second signal;
        iv. a verifying component for authenticating the second signal by determining if the second signal has authentication data; and
        v. a first indicator for indicating whether the license is detected and a second indicator for indicating whether the license is not detected.

18. The system as claimed in claim 17 wherein the first and second indicators comprise one or more visual confirmations.

19. The system as claimed in claim 17 wherein the first and second indicators comprise one or more light emitting diodes.

20. The system as claimed in claim 17 further comprising a remote system for receiving a request signal containing information within the tag device for determining a good standing, suspended or revoked status of the license and transmitting a status signal containing the status of the license to the detector.

21. A method of detecting the presence of a license within a vehicle comprising:
   a. transmitting a first signal from a detector to a tag device within the license;
   b. receiving a second signal at the detector from the tag device;
   c. authenticating the second signal by determining if the second signal has authentication data; and
   d. indicating whether the license is detected with a first indicator and indicating whether the license is not detected with a second indicator.

22. The method as claimed in claim 21 wherein the tag device is a Radio Frequency IDentification tag.

23. The method as claimed in claim 21 wherein the tag device is selected from the group consisting of passive, semi-passive and active tags.

24. The method as claimed in claim 21 wherein the license is selected from the group consisting of a driver's license, a fishing license, a hunting license, a pilot's license and a government issued identification.

25. The method as claimed in claim 21 further comprising verifying validity of the content of the second signal with a verifying component by comparing the content of the second signal to a set of verified content.

26. The method as claimed in claim 21 wherein the first and second indicators comprise one or more visual confirmations.

27. The method as claimed in claim 21 wherein the first and second indicators comprise one or more light emitting diodes.

28. The method as claimed in claim 21 further comprising transmitting a third signal to a remote location to determine a good standing, suspended or revoked status of the license.

29. The method as claimed in claim 21 wherein the detector is hand-held.

30. The method as claimed in claim 21 wherein the detector is portable.

31. The method as claimed in claim 21 wherein the detector is affixed to an immobile object.

32. The method as claimed in claim 21 wherein the detector is affixed to a police car.

33. The method as claimed in claim 21 further comprising transmitting a third signal containing information within the tag device to a remote device and receiving a fourth signal at the detector from the remote device containing a good standing, suspended or revoked status of the license.

34. A method of detecting the presence of a license comprising:
   a. acquiring a target vehicle;
   b. transmitting a first signal from a detector towards the target vehicle;
   c. waiting to receive a second signal from a tag device coupled to the license within the target vehicle;
   d. indicating whether the license is or is not detected within the target vehicle; and
   e. authenticating the second signal by determining if the second signal has authentication data.

35. The method as claimed in claim 34 wherein the tag device is a Radio Frequency IDentification tag.

36. The method as claimed in claim 34 wherein the tag device is selected from the group consisting of passive, semi-passive and active tags.

37. The method as claimed in claim 34 wherein the license is selected from the group consisting of a driver's license, a fishing license, a hunting license, a pilot's license and a government issued identification.

38. The method as claimed in claim 34 further comprising verifying validity of the content of the second signal with a verifying component by comparing the content of the second signal to a set of verified content.

39. The method as claimed in claim 34 further comprising indicating whether the license is detected with a first indicator and indicating whether the license is not detected with a second indicator.

40. The method as claimed in claim 39 wherein the first and second indicators comprise one or more visual confirmations.

41. The method as claimed in claim 39 wherein the first and second indicators comprise one or more light emitting diodes.

42. The method as claimed in claim 34 further comprising transmitting a third signal containing information within the tag device to a remote device and receiving a fourth signal at the detector from the remote device containing a good standing, suspended or revoked status of the license.

43. A detector for detecting the presence of a driver's license, comprising:
   a. a processor for processing information received from a tag device within the license;
   b. a first transmitter for transmitting a first signal to the tag device within the driver's license;
   c. a sensor for sensing a second signal received from the tag device within the driver's license;
   d. a verifying component for authenticating the second signal by determining if the second signal has authentication data; and
   e. a first indicator for indicating whether the driver's license is detected, a second indicator for indicating whether the driver's license is not detected and a third indicator for indicating whether the driver's license has been detected but was not able to be verified.

44. The detector as claimed in claim 43 further comprising a second transmitter to transmit a third signal to a remote location.

45. The detector as claimed in claim 43 wherein the processor communicates with a remote system to determine a good standing, suspended or revoked status of the driver's license.

* * * * *